United States Patent
Oberle

(10) Patent No.: US 10,200,439 B2
(45) Date of Patent: Feb. 5, 2019

(54) IN-MEMORY CLOUD TRIPLE STORE

(71) Applicant: Daniel Oberle, Durmersheim (DE)

(72) Inventor: Daniel Oberle, Durmersheim (DE)

(73) Assignee: SAP SE, Walldorf (DE)

(*) Notice: Subject to any disclaimer, the term of this patent is extended or adjusted under 35 U.S.C. 154(b) by 388 days.

(21) Appl. No.: 14/445,343

(22) Filed: Jul. 29, 2014

(65) Prior Publication Data

US 2016/0034538 A1 Feb. 4, 2016

(51) Int. Cl.
*H04L 29/06* (2006.01)
*H04L 29/08* (2006.01)

(52) U.S. Cl.
CPC ............ *H04L 67/02* (2013.01); *H04L 63/083* (2013.01); *H04L 67/1097* (2013.01)

(58) Field of Classification Search
CPC ......... G06F 17/30342; G06F 17/30528; G06F 17/30554; G06F 17/30734; G06F 17/30867; H04L 63/083; H04L 67/02; H04L 67/1097
See application file for complete search history.

(56) References Cited

U.S. PATENT DOCUMENTS

| | | | | |
|---|---|---|---|---|
| 2007/0185897 A1* | 8/2007 | Betz | ................. | G06F 17/30873 |
| 2008/0243770 A1* | 10/2008 | Aasman | ............ | G06F 17/30587 |
| 2010/0114885 A1* | 5/2010 | Bowers | ............. | G06F 17/30471 |
| | | | | 707/736 |
| 2010/0318558 A1* | 12/2010 | Boothroyd | ........ | G06F 17/30731 |
| | | | | 707/769 |
| 2012/0134548 A1* | 5/2012 | Rhoads | .................. | G06Q 30/06 |
| | | | | 382/118 |
| 2014/0101177 A1* | 4/2014 | Saito | ................. | G06F 17/30303 |
| | | | | 707/755 |
| 2014/0108414 A1* | 4/2014 | Stillerman | .......... | G06F 17/3048 |
| | | | | 707/741 |
| 2015/0370544 A1* | 12/2015 | Santry | ...................... | G06F 8/41 |
| | | | | 717/145 |

OTHER PUBLICATIONS

Apache Jena, "SDB Store Description", Jun. 7, 2012, https://web.archive.org/web/20120607215530/https://jena.apache.org/documentation/sdb/store_description.htnnl, pp. 1-3 (Year: 2012).*

(Continued)

*Primary Examiner* — Jorge A Casanova
(74) *Attorney, Agent, or Firm* — Schwegman Lundberg & Woessner, P.A.

(57) ABSTRACT

In an example embodiment, a triple to store in a triple store is received from a first application, the triple defining data having a subject, predicate, and object. The triple is sent to a triple store interface configured to store the triple in an in-memory database management system. Later, a request from a second application to query the triple store is received. A cloud-based triple store query server is used to process the request and generate an in-memory database management system query to the in-memory database management system. Results of the in-memory database management system query are received from the in-memory database management system. The result is sent to the second application for display to a user.

20 Claims, 9 Drawing Sheets

(56) References Cited

OTHER PUBLICATIONS

"4store—Scalable RDF storage", Garlik, [Online]. Retrieved from the Internet: <URL: www.4store.org>, (Accessed Dec. 23, 2015), 1 pg.
"5store—4store", Wikipedia, [Online]. Retrieved from the Internet: <URL: http://4store.org/trac/wiki/5store>, (Accessed Dec. 23, 2015), 1 pg.
"AllegroGraph RFDStore Web 3.0 Database", Franz Inc., [Online]. Retrieved from the Internet: <URL: http://franz.com/agraph/allegrograph/, (Accessed Dec. 23, 2015), 1 pg.
"Apache Jena", [Online]. Retrieved from the Internet: <URL: http://jena.apache.org/>, (Accessed Dec. 23, 2015), 4 pgs.
"BigData.com: Media Options", Media Options, [Online]. Retrieved from the Internet: <URL: http://www.mediaoptions.com/brokered-domains/bigdata-com>, (Accessed Dec. 23, 2015), 2 pgs.
"Brightstar DB: Anative RDF database for the .NET platform", [Online]. Retrieved from the Internet: <URL: http://brightstardb.com/>, (Accessed Dec. 23, 2015), 3 pgs.
"Dydra: Networks Made Friendly", Datagraph Inc., [Online]. Retrieved from the Internet: <URL: http://dydra.com/>. (Accessed Dec. 23, 2015), 2 pgs.
"IBM Knowledge Center: RDF application development for IBM data servers", [Online]. Retrieved from the Internet: <URL: http://www-01.ibm.com/support/knowledgecenter/SSEPGG_10.1.0/com.ibm.swg.im.dbclient.rdf.doc/doc/. . . , (Accessed Dec. 23, 2015), 1 pg.
"Index of /2004/06/yars", [Online]. Retrieved from the Internet: <URL: https://web.archive.org/web/20041017223234/http://sw.deri.org/2004/06/yars/>, (Oct. 17, 2004), 1 pag.
"Intellidimension—Semantic Web Tools and Technology for Windows, RDF for .NET Framework", [Online]. Retrieved from the Internet: <URL:http://www.intellidimension.com/company/news/#semantics-platform-v2>, (Accessed Dec. 28, 2015), 2 pgs.
"Open Anzo", [Online]. Retrieved from the Internet: <URL: http://www.openanzo.org/>. (Accessed Dec. 23, 2015), 2 pgs.
"OpenLink Virtuoso Home Page", [Online]. Retrieved from the Internet: <URL: http://virtuoso.openlinksw.com>, (Accessed Dec. 23, 2015), 2 pgs.
"Oracle Spatial and Graph—RDF Sematic Graph", [Online]. Retrieved from the Internet: <URL: http://www.oracle.com/technetwork/database-options/spatialandgraph/overview/rdfsemantic-graph-1902016.html>, (Accessed Dec. 28, 2015), 2 pgs.
"OWLIM: Balancing Between Scalable Repository and Light-Wight Reasoner", Onototext, [Online]. Retrieved from the Internet: <URL: http://ontotext.com/knowledgehub/publications/owlim>., (Accessed Dec. 23, 2015), 2 pgs.
"Parliament High-Performance Triple Store", [Online]. Retrieved from the Internet: <URL: http://parliament.semwebcentral.org/>, (Accessed Dec. 28, 2015), 3 pgs.
"Pointrel Social Semantic Desktop download", SourceForge.net, [Online]. Retrieved from the Internet: <URL: http://sourceforge.net/projects/pointrel/>, (Accessed Dec. 28, 2015), 5 pgs.
"Profium Sense", [Online]. Retrieved from the Internet: <URL: http://www.profium.com/en/technologies/profium-sense>, (Accessed Dec. 28, 2015), 2 pgs.
"RAP—RDF API for PHP V0.9.6", [Online]. Retrieved from the Internet: <URL: http://wifo5-03.informatik.uni-mannheim.de/bizer/rdfapi/>, (Accessed Dec. 28, 2015), 4 pgs.
"RDFBroker", [Online]. Retrieved from the Internet: <URL: http://rdfbroker.opendfki.de/>, (Accessed Dec. 28, 2015), 1 pgs.
"RDFLib", GitHub, Inc., [Online]. Retrieved from the Internet: <URL: https://github.com/RDFLib/rdflib>, (Accessed Dec. 28, 2015), 5 pgs.
"Saffron", [Online]. Retrieved from the Internet: <URL: http://saffrontech.com/>, (Accessed Dec. 28, 2015), 14 pgs.
"Semafora Systems: OntoBroker", [Online]. Retrieved from the Internet: <URL: http://www.semafora-systems.com/en/products/ontobroker/>, (Accessed Dec. 23, 2015), 1 pgs.
"Sesame", [Online]. Retrieved from the Internet: <URL: www.openrdf.org>, (Accessed Dec. 28, 2015), 3 pgs.
"Soprano—the Qt/C++ RDF framework", [Online]. Retrieved from the Internet: <URL: http://soprano.sourceforge.net/>, (Accessed Dec. 28, 2015), 1 pg.
"Stardog: Enterprise Graph Database", [Online]. Retrieved from the Internet: <URL: http://stardog.com/>, (Accessed Dec. 28, 2015), 7 pgs.
"StrixDB RDF graphs database", [Online]. Retrieved from the Internet: <URL: https://web.archive.org/web/20101024081640/http://www.strixdb.com/>, (Oct. 24, 2010), 2 pgs.
"Welcome to the Mulgara Project!", [Online]. Retrieved from the Internet: <URL: http://www.mulgara.org/>, (Accessed Dec. 23, 2015), 1 pg.
"Working with RDF with Perl", [Online]. Retrieved from the Internet: <URL: http://www.perlrdf.org/>, (Accessed Dec. 28, 2015), 1 pg.
Alvarado, Rema, "Turning Shoe Information to Knowledge of Technology and Deals", Aktors: Advanced Knowledge Technologies for Shoes, [Online]. Retrieved from the Internet: <URL: http://www.aktors.org/>, (Accessed Dec. 23, 2015), 8 pgs.
Balandin, Sergey, et al., "Smart-M3 download", SourceForge.net, [Online]. Retrieved from the Internet: <URL: http://sourceforge.net/projects/smart-m3/>, (Accessed Dec. 28, 2015) 6 pgs.
Beckett, Dave, "Redland RDF Libraries", [Online]. Retrieved from the Internet: <URL:, (Accessed Dec. 28, 2015), 1 pg.
Berners-Lee, Tim, "Semantic Web Road Map", [Online]. Retrieved from the Internet: <URL: http://www.w3.org/DesignIssues/Semantic.html>, (Sep. 1998), 12 pgs.
Bhatti, N., et al., "Web Based Semantic Visualization to Explore Knowledge Spaces—An Approach for Learning by Exploring", Proceedings of World Conference on Educational Multimedia, Hypermedia and Telecommunications 2008 (pp. 312-322). Chesapeake, VA: AACE., (2008), 312-322.
Farber, Franz, et al., "SAP HANA Database: Data Management for Modern Business Applications", SIGMOD Record, Dec. 2011 (vol. 40, No. 4), (2011), 45-51.
Gennari, John, et al., "The evolution of Protlegle: an environment for knowledge-based systems development", Int. J. Human-Computer Studies 58 (2003), (2003), 89-123.
Gruber, Thomas, "Toward principles for the design of ontologies used for knowledge sharing", Int. J. Human-Computer Studies (1995) 43, (1995), 907-928.
Henriksen, Inge, "SparkleDB", [Online]. Retrieved from the Internet: <URL: https://web.archive.org/web/20130715104837/http://www.sparkledb.net>, (Jul. 15, 2013), 4 pgs.
Humfrey, Nicholas, "RedStore", [Online]. Retrieved from the Internet: <URL: https://web.archive.org/web/20100716201313/http://www.aelius.com/njh/redstore>, (Jul. 16, 2010), 2 pgs.
Neumann, Thomas, "RDF-3X : Thomas Neumann: D5 Databases and Information Systems", Max Planck Institut Informatik, [Online]. Retrieved from the Internet: <URL: https://web.archive.org/web/20090418163301/http://www.mpi-inf.mpg.de/~neumann/rdf3x/>, (Apr. 18, 2009), 2 pgs.
Nowack, Benjamin, "GitHub: semsol/arc2", Wikipedia, [Online]. Retrieved from the Internet: <URL: https://github.com/semsol/arc2/wiki>, (Jan. 23, 2014), 3 pgs.
Pokorny, Dan, "RDF-Core", [Online]. Retrieved from the Internet: <URL: search.cpan.org/dist/RDF-Core>, (Feb. 19, 2007), 2 pgs.
Tauberer, Joshua, "Semantic Web/RDF Library for C#/.NET", [Online]. Retrieved from the Internet: <URL: https://web.archive.org/web/20060813071143/http://razor.occams.info/code/semweb/>, (Aug. 13, 2006), 1 pg.
Uschold, Michael, et al., "Ontologies and Semantics for Seamless Connectivity", SIGMOD Record, 33(4), (Dec. 2004), 58-64.

\* cited by examiner

IN-MEMORY CLOUD TRIPLE STORE

TECHNICAL FIELD

This document generally relates to systems and methods for use with the storage of triples. More specifically, this document relates to methods and systems for an in-memory cloud triple store.

BACKGROUND

The semantic web is a collaborative movement led by an international standards body to promote common data formats on the World Wide Web. The goal is to provide a framework that allows systems to automatically analyze information from the Internet without (or with minimal) human interaction. The semantic web augments typical World Wide Web information by giving information a well-defined meaning. It provides for the publishing of web information in languages specifically designed to handle and communicate this well-defined meaning, such as Resource Description Framework (RDF). RDF Schema (RDFS) extends RDF by class and property hierarchies that enable the creation of ontologies, which are conceptual data models understandable for both humans and computers.

The main organizing principle of RDF is triples in the form of (subject, predicate, object). Typically, schema (which includes the definitions of classes) and instance data (instantiations of those classes) are represented in the same ontology graph. Accordingly, triple stores are used to persist, manage, and query large amounts of RDF triples. Triple stores typically support the SPARQL Protocol and RDF Query Language (SPARQL), which is a query and data manipulation language for triple stores, providing the ability to retrieve and manipulate data stored in RDF. A problem is encountered, however, in that triple stores have to be obtained, installed, run, and maintained by entities which wish to utilize the semantic web. This requires upfront investment, lifecycle costs, and the expertise of a developer.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a triple store is located in a cloud and stored in-memory. This allows a triple store to be provided as a service to avoid acquisition, installation, and maintenance costs. Additionally, since the triple store is located in-memory, it can be accessed and updated much more quickly than if it was located in an ordinary database management system.

Figure 1:
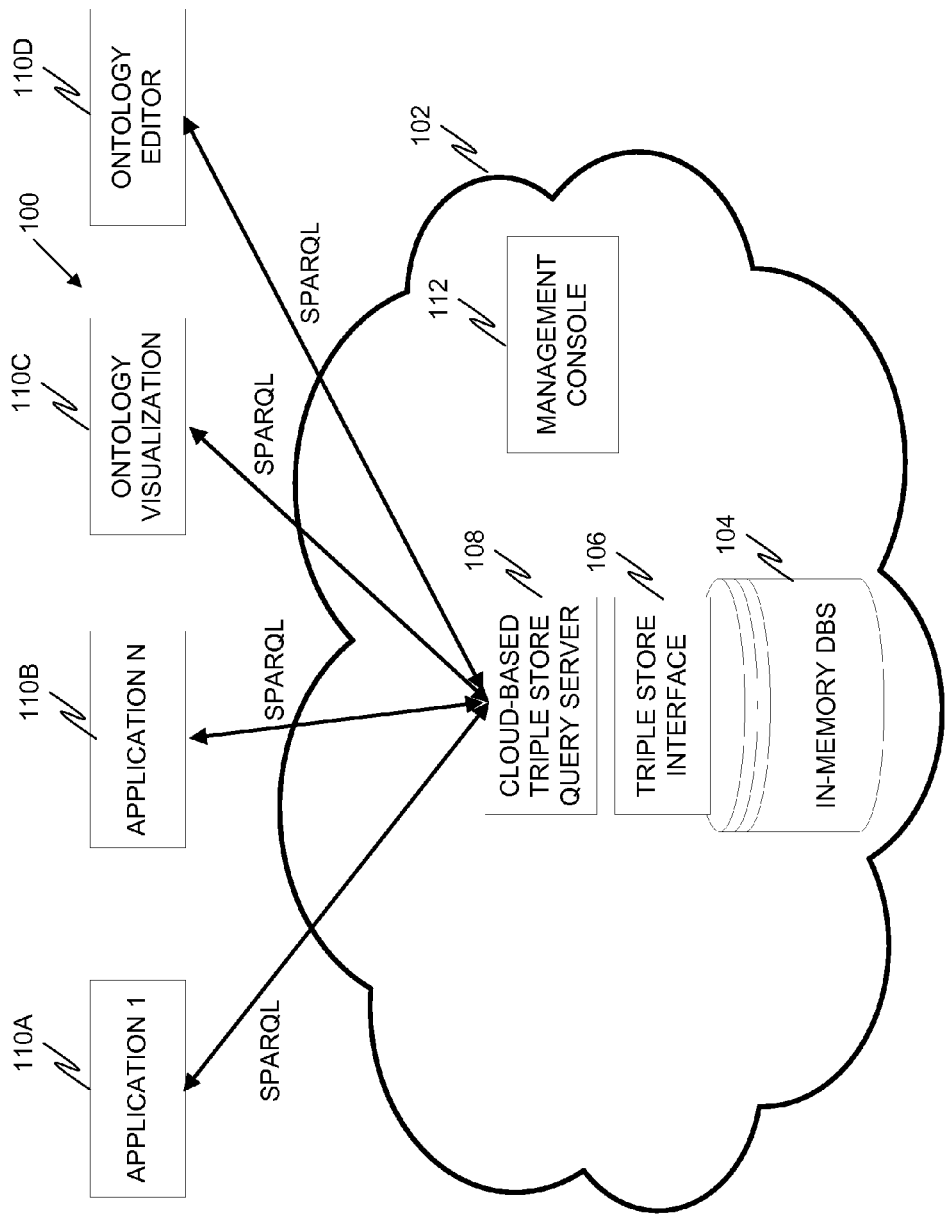
FIG. 1 is a diagram illustrating a system, in accordance with an example embodiment, for providing a triple store.

FIG. 1 is a diagram illustrating a system 100, in accordance with an example embodiment, for providing a triple store. In the system 100, a cloud 102 may be used as a platform to deliver the service. In particular, an in-memory database management system 104 may be used for fast in-memory storage of triples. A triple store interface 106 may be provided on top of the in-memory database management system 104 to provide a convenient interface for applications to communicate with the triple store using a triple store communication language, such as, for example, RDF.

In turn, a cloud-based triple store query server 108 can sit on top of the triple store to allow for querying and updating triples via a web language, such as HyperText Transfer Protocol (HTTP). In an example embodiment the cloud-based triple store query server 108 is a SPARQL server. The interface on the cloud-based triple store query server 108 can then be used by a number of different applications 110A-110B that make use of the triple store in the cloud. An ontology visualization application 110C may be provided to allow users to view the contents of the triple store in a graphical and user-friendly way. An ontology editor 110D is provided to enable a user to author contents of the triple store, especially the schema, via a web-based interface.

Additionally, an administration and management functionality may be provided. Specifically, a management console 112 may provide a web front end that allows administrators to configure and maintain the triple store and cloud-based triple store query server 108.

Figure 2:
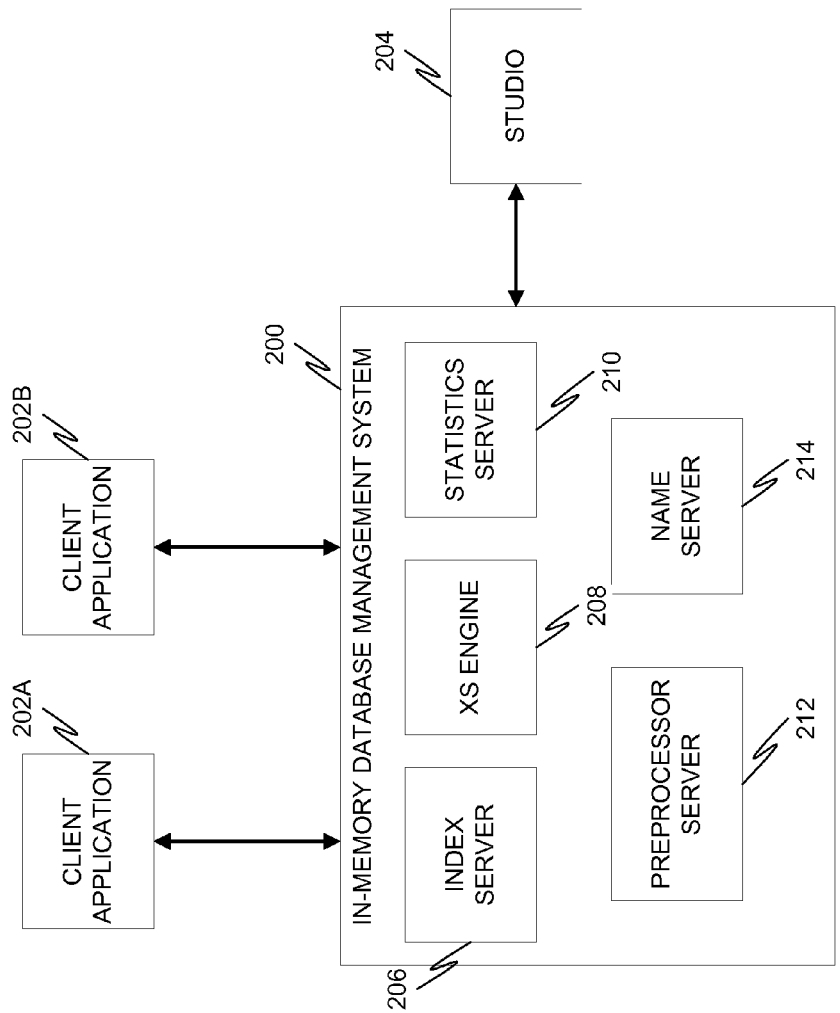
FIG. 2 is a diagram illustrating an in-memory database management system in accordance with an example embodiment.

FIG. 2 is a diagram illustrating an in-memory database management system 200 in accordance with an example embodiment. For example, the in-memory database management system 200 may be the in-memory database management system 104 in FIG. 1. Here, the in-memory database management system 200 may be coupled to one or more client applications 202A, 202B. The client applications 202A, 202B may communicate with the in-memory database management system 200 through a number of different protocols, including Structured Query Language (SQL), Multidimensional Expressions (MDX), Hypertext Transfer Protocol (HTTP), Representational State Transfer (REST), and Hypertext Markup Language (HTML).

Also depicted is a studio 204, used to perform modeling by accessing the in-memory database management system 200. In an example embodiment, a studio 204 can allow complex analysis to be performed on data drawn not only from real time event data and windows, but also from stored database information.

The in-memory database management system 200 may comprise a number of different components, including an index server 206, an XS engine 208, a statistics server 210, a preprocessor server 212, and a name server 214. These components may operate on a single computing device, or may be spread among multiple computing devices (e.g., separate servers).

The index server 206 contains the actual data and the engines for processing the data. It also coordinates and uses all the other servers.

The XS engine 208 allows clients to connect to the in-memory database management system 200 using web protocols, such as Hypertext Transfer Protocol (HTTP).

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which the text search capabilities are based.

The name server 214 holds information about the database topology. This is used in a distributed system with instances of the database on different hosts. The name server 214 knows where the components are running and which data is located on which server.

Figure 3:
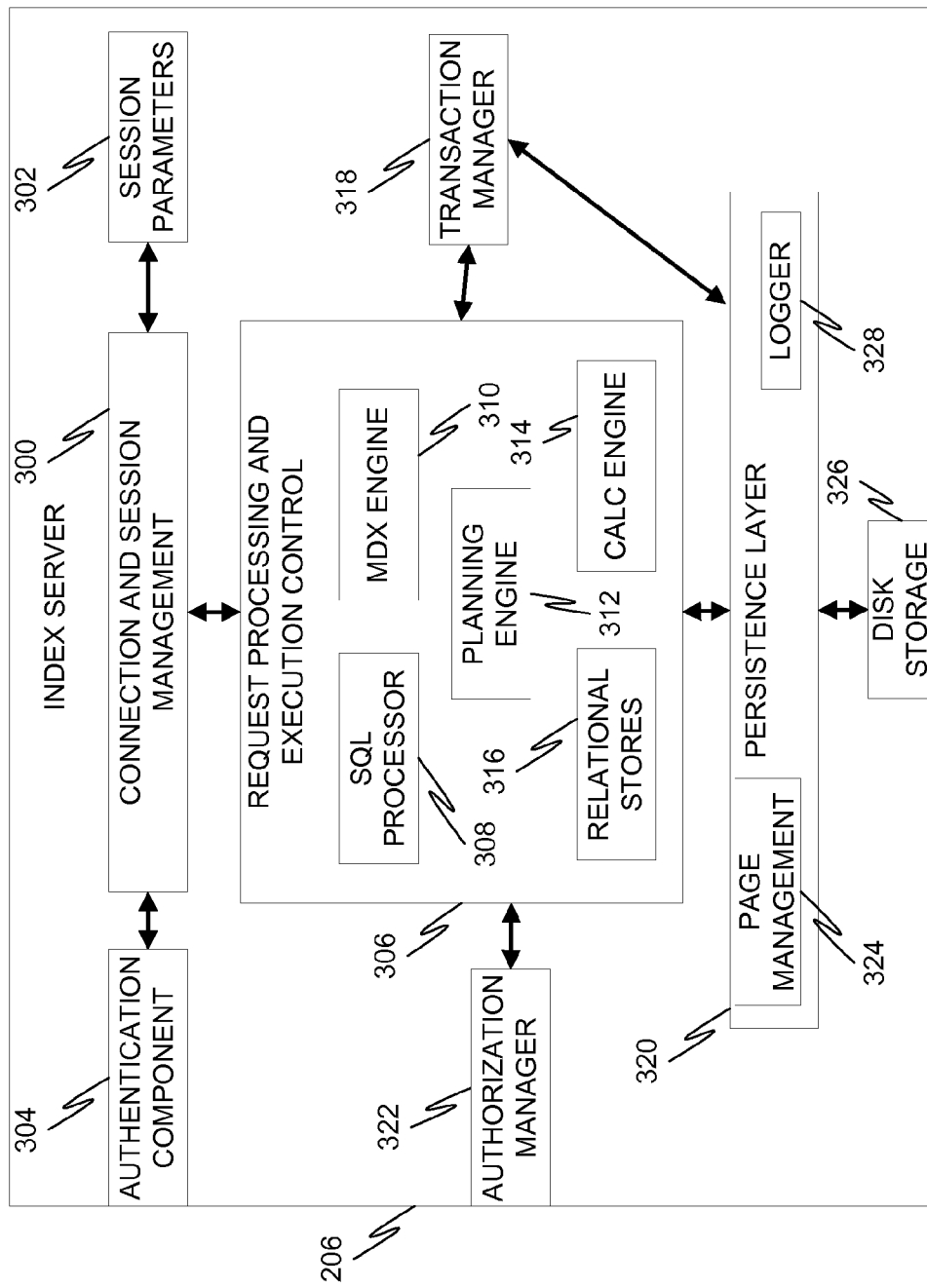
FIG. 3 is a diagram illustrating an index server in accordance with an example embodiment.

FIG. 3 is a diagram illustrating an index server 206 in accordance with an example embodiment. Specifically, the index server 206 of FIG. 2 is depicted in more detail. The index server 206 includes a connection and session management component 300, which is responsible for creating and managing sessions and connections for the database clients. Once a session is established, clients can communicate with the database system using SQL statements. For each session, a set of session parameters 302 may be maintained, such as auto-commit, current transaction isolation level, etc. Users (e.g., system administrators, developers) may be authenticated by the database system itself (e.g., by logging in with user name and password, using an authentication component 304) or authentication can be delegated to an external authentication provider such as a Lightweight Directory Access Protocol (LDAP) directory.

The client requests can be analyzed and executed by a set of components summarized as request processing and execution control 306. An SQL processor 308 checks the syntax and semantics of the client SQL statements and generates a logical execution plan. Multidimensional expressions (MDX) is a language for querying and manipulating multidimensional data stored in OLAP cubes. As such, an MDX engine 310 is provided to allow for the parsing and executing of MDX commands. A planning engine 312 allows applications (e.g., financial planning applications) to execute basic planning operations in the database layer. One such operation is to create a new version of a dataset as a copy of an existing dataset, while applying filters and transformations.

A calculation engine 314 implements the various SQL script and planning operations. The calculation engine 314 creates a logical execution plan for calculation models derived from SQL script, MDX, planning, and domain-specific models. This logical execution plan may include, for example, breaking up a model into operations that can be processed in parallel.

The data is stored in relational stores 316, which implement a relational database in main memory.

Each SQL statement may be processed in the context of a transaction. New sessions are implicitly assigned to a new transaction. A transaction manager 318 coordinates database transactions, controls transactional isolation, and keeps track of running and closed transactions. When a transaction is committed or rolled back, the transaction manager 318 informs the involved engines about this event so they can execute needed actions. The transaction manager 318 also cooperates with a persistence layer 320 to achieve atomic and durable transactions.

An authorization manager 322 is invoked by other database system components to check whether the user has the specified privileges to execute the requested operations. The database system allows for the granting of privileges to users or roles. A privilege grants the right to perform a specified operation on a specified object.

The persistence layer 320 ensures that the database is restored to the most recent committed state after a restart and that transactions are either completely executed or completely undone. To achieve this goal in an efficient way, the persistence layer 320 uses a combination of write-ahead logs, shadow paging, and save points. The persistence layer 320 also offers a page management interface 324 for writing and reading data to a separate disk storage 326, and also contains a logger 328 that manages the transaction log. Log entries can be written implicitly by the persistence layer 320 when data is written via the persistence interface or explicitly by using a log interface.

Figure 4:
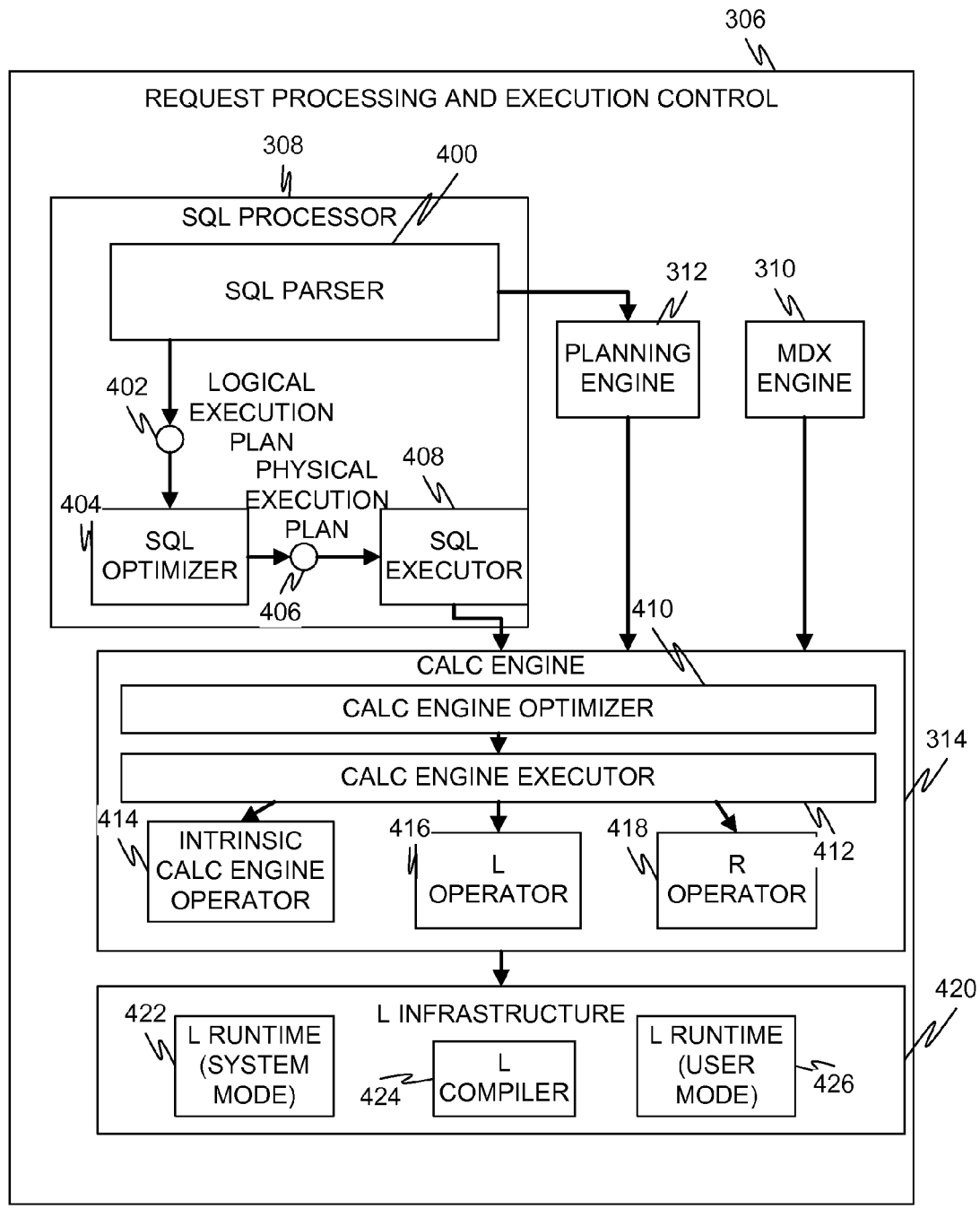
FIG. 4 is a diagram illustrating a request processing and execution control in accordance with an example embodiment.

FIG. 4 is a diagram illustrating a request processing and execution control 306 in accordance with an example embodiment. This diagram depicts the request processing and execution control 306 of FIG. 3 in more detail. The SQL processor 308 contains an SQL parser 400, which parses the SQL statement and generates a logical execution plan 402, which it passes to an SQL optimizer 404. The SQL optimizer 404 then optimizes the logical execution plan 402 and converts it to a physical execution plan 406, which it then passes to an SQL executor 408. The calc engine 314 implements the various SQL script and planning operations, and includes a calc engine optimizer 410, which optimizes the operations, and a calc engine executor 412, which executes the operations, as well as an intrinsic calc engine operator 414, an L operator 416, and an R operator 418.

An L infrastructure 420 includes a number of components to aid in the running of L procedures, including an L-runtime (system mode) 422, an L compiler 424, and an L-runtime (User mode) 426.

As described earlier, a triple store is a purpose-built database management system for the storage and retrieval of triples, and specifically RDF triples in some example embodiments. Similar to a relational database system, information is stored in a triple store and retrieved by a query language. Unlike a relational database management system, however, a triple store is optimized for the storage and retrieval of triples. In addition to queries, triples can usually be imported/exported using RDF or other formats.

Some triple stores have been built as database engines from scratch, while others have been built on top of existing commercial relational database engines. The latter method allows the realization of a triple store with little programming effort. However, relational databases utilize Structured Query Language (SQL), over which it can be difficult to implement triples stores because of the difficulty of implementing efficient querying of a graph-based RDF model onto SQL queries.

In order to solve these problems, in an example embodiment, a triple store is created inside an in-memory database management system. The in-memory storage and management capabilities of such a system can be exploited by the triple store. In order to do so, in an example embodiment, an interface is placed between the triple store and the in-memory database management system, such that the persistence of the triple store is fully managed by the in-memory database management system.

Additionally, an in-memory database management system may, in some example embodiments, provide sophisticated connection management. Rather than providing user, password, and connection parameters for access, a cloud environment can dynamically create and manage such metadata in a registry, such as a Java Naming and Directory Interface (JNDI) registry. An application can then retrieve the desired connection metadata conveniently from this registry. However, existing triple stores typically require that connection metadata be specifically provided. Accordingly, in an example embodiment, the triple store is adapted to retrieve connection metadata from the cloud registry.

In an example embodiment, the cloud 102 of FIG. 1 runs Open Service Gateway initiative (OSGi) on the server-side. The OSGi framework is a module system and service platform for the Java programming language that implements a complete and dynamic component model, which does not exist in standalone Java/virtual machine environments. Applications or components (coming in the form of bundles for deployment) can be remotely installed, started, stopped, updated, and uninstalled without requiring a reboot, and management of Java packages/classes is specified in great detail. Application life cycle management (e.g., start, stop, install, etc.) is performed via APIs that allow for the remote downloading of management policies. The service registry allows bundles to detect the addition of new services, or the removal of services, and adapt accordingly.

Existing triple stores are not designed in an OSGi-compliant way. Therefore, existing triple stores are not deployable to the cloud without exposing library conflicts. In an example embodiment, a detailed reassembly or reconfiguration of OSGi bundles is performed in order to avoid such conflicts.

In an example embodiment, an existing triple store called Apache Jena is modified for use with a cloud-based in-memory database management system. In particular, Apache Jena features an RDF API that allows programmatic access to triples stored in main memory or in a relational database. In an example embodiment, these aspects are modified to allow for cloud deployment. Triples may be stored in predefined tables in the in-memory database management system. Additionally, Apache Jena expects a configuration file with connection parameters to a relational database. The following is an example configuration file that can be used to store connection parameters

```
<#store> rdf:type         sdb:Store ;
    rdfs:label                          "SDB" ;
    sdb:layout                          "layout2" ;
    sdb:connection
        [       rdf:type                sdb:SDBConnection ;
                sdb:sdbType             "hdb" ;
                sdb:sdbHost             "vadbj17.nwtrial.od.sap.biz:30015" ;
    sdb:sdbName                         "Smarter Privacy ontologies"
                sdb:sdbUser             "JP_D046758TRIAL_JENAFUSE_00001";
                sdb:sdbPassword             "Wq3G5pP11t6S4xd";
                sdb:driver              "com.sap.db.jdbc.Driver,,;
                sdb:jdbcURL             "jdbc:sap://vadbj17.nwtrial.od.sap.biz:30015"
        ].
```

The password is typically transparent to the cloud developer and changes with every new deployment. In an example embodiment, the way to establish a connection is to get the desired metadata from the cloud registry. Thus, a pointer to the corresponding registry entry can be provided. Accordingly, the configuration file above can be modified to specify this entry, such as by adding the following to the configuration file above:

sap:jndiDataSource "jdbc/DefaultDB,,;

Deploying Apache Jena in the context of OSGi may reveal many library conflicts. One such conflict concerns the Java package org.w3c.dom, which is a so-called split package is OSGi. In theory two packages (with the same name) are split when they come from different providers and contain different classes (this includes different versions of the same classes or completely different classes). Here, the Java Developers Kit (JDK) system bundle contains the org.w3c.dom package and the Apache Jena Library xml-apis.jar contains some more classes in addition to the classes from the JDK (in particular org.w3c.dom.ElementTraversal). At runtime, the deployed Apache Jena imports org/w3c.dom and gets it from the JDK. This means that Apache Jena only sees the classes in the JDK and the actual xml-apis.jar library will not be visible. The result will be java.lang.NoClassDefFoundError for org/w3c/dom/ElementTraversal. In an example embodiment, the two packages are combined. In order to do so, OSGi may be made aware that there are two exporters of the package. This can be performed by adding information to the export-package header. One solution is to add something like the line "export package: org.w3c.dom", but that would mean that this package is available for every other consumer in the cloud environment and in some cases it will shadow the JDK package. This is not desirable, and thus in an example embodiment an attribute "jena=true" is added to the export. Adding this attribute means that in order to get the package, the importer will need to specify the attribute when importing the package. Additionally, the fact that this attribute should be specified on the import may be indicated by ";mandatory:=jena."

In the end, OSGi should know that something is wrong with the package, namely that it is split. In an example embodiment, "triplestore=split" may be added (triplestore being the name of the deployed application). Up to now, two exporters of the package have been declared. Now packages from both of them may be imported and combined as follows: "Import-Package: org.w3c.dom;jena=true" for the application package and "Require-Bundle: org.eclipse.osgi" for the JDK package.

As describe earlier, SPARQL is an RDF query and update language for triple stores. SPARQL allows for a query to comprise triple patterns, conjunctions, disjunctions, and optional patterns. Consequently, a SPARQL process parses SPARQL statements and retrieves results. Typically SPARQL queries and results are processed via HTTP and a web server. Corresponding "SPARQL endpoints" are put in place by a SPARQL server to allow clients to access the SPARQL processor, for example by REST services.

One issue with using an existing SPARQL server in a cloud environment is that the cloud environment already features a web server. Therefore, in an example embodiment, the web server functionality of a SPARQL server may be removed and the cloud's web server used instead. In some embodiments, this may be performed using deep adaptations including the rewriting of URLs, since cloud applications have a context path.

Additionally, many SPARQL servers feature a management console which allows the user to configured the server via a graphical interface. In an example embodiment, the management console of the SPARQL server is integrated into the overall management console in order to have a holistic and integrated management console for all aspects. The overall management console is able to offer additional features above and beyond what a SPARQL server management console could provide alone.

Figure 5:
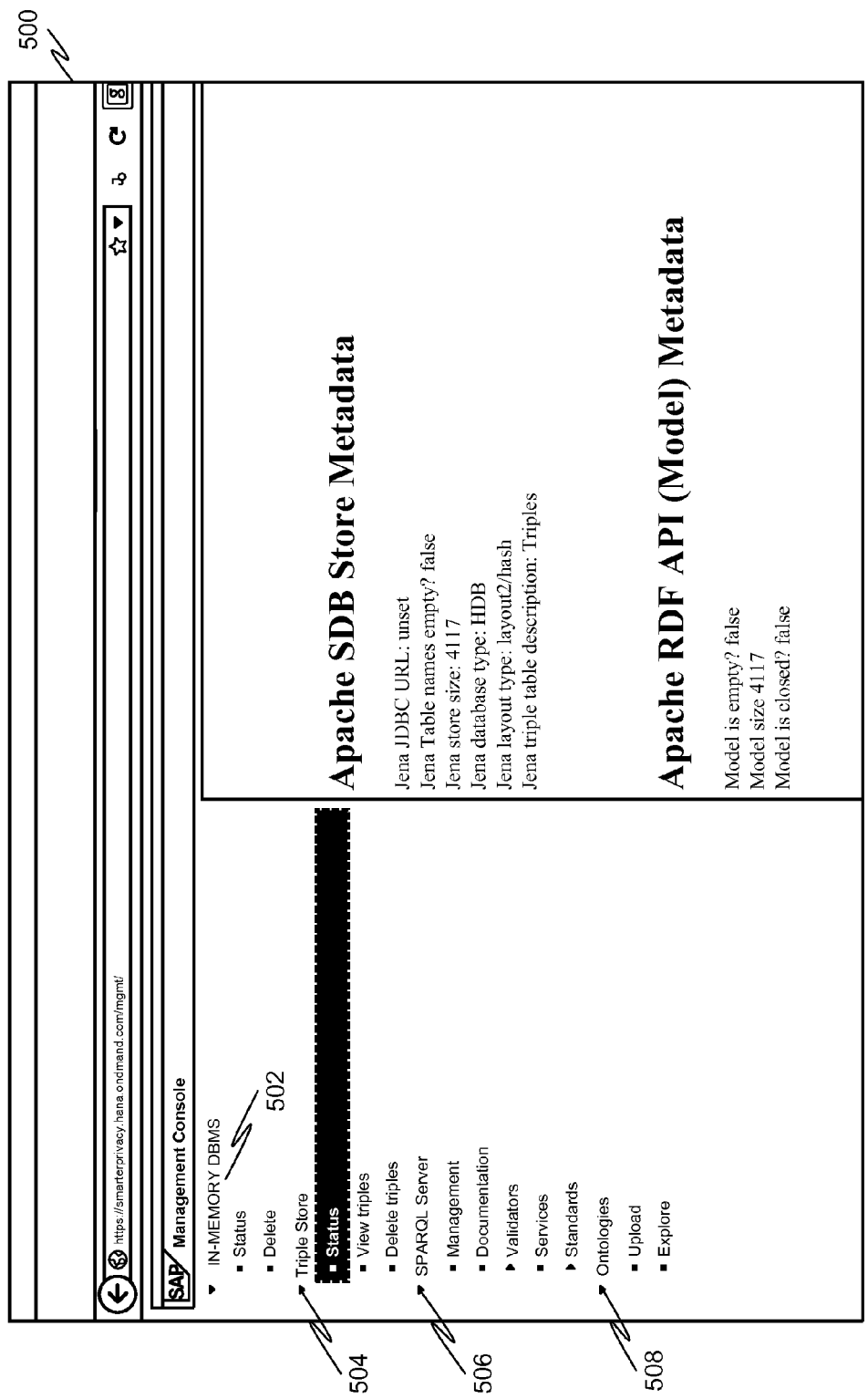
FIG. 5 is a screen capture illustrating an example management console in accordance with an example embodiment.

FIG. 5 is a screen capture illustrating an example management console 500 in accordance with an example embodiment. As described above, the management console 500 provides holistic control of many different aspects of the new system, including control over the in-memory database 502, the triple store 504 and the SPARQL server 506. Additionally, various ontologies 508 may be uploaded and/or explored through the management console.

Figure 6:
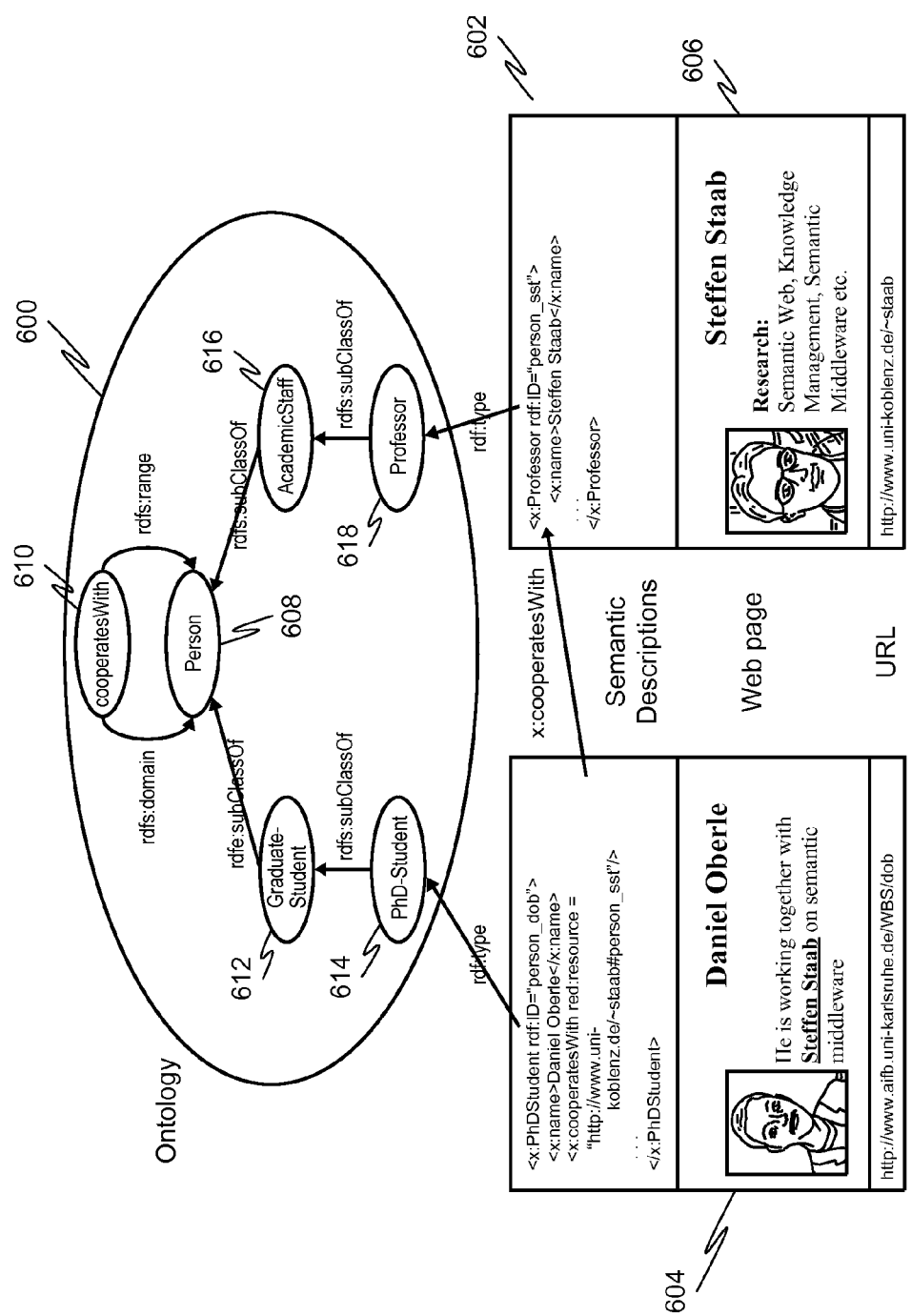
FIG. 6 is one example of an ontology that can be displayed to a user by the management console in accordance with an example embodiment.

The management console 500 allows a user to explore the contents of the triple store by interpreting them as ontologies. In this way, the user gets a graphical view of the contents with classes, relations, and instances. FIG. 6 is one example of an ontology 600 that can be displayed to a user by the management console 500 in accordance with an example embodiment. Here, the ontology 600 represents information 602 depicted at the bottom of this figure. Specifically, a PhD student named Daniel Oberle 604 cooperates with a Professor named Steffen Staab 606. The ontology 600 describes a person class 608 and a cooperatesWith relationship 610. Danial Oberle 604 is part of a subclass of the person class 608 called a Graduate-Student class 612, which further has a PhD-Student subclass 614. Steffan Staab 606 is part of a subclass of the person class 608 called an AcademicStaff class 616, which further has a Professor 618 subclass.

A further challenge of making the triple store conveniently manageable in the cloud is how to edit its content instantly as ontologies (and not as the more technical triples). Changes and updates can always be executed programmatically via the corresponding SPARQL endpoint. However, a human user may also wish to author the ontology via a user-friendly interface. As such, in an example embodiment an interface is provided to allow the user to directly edit ontologies.

Additionally, in some example embodiments, library conflicts may need to be resolved in order to integrate a SPARQL server into the cloud environment.

Figure 7:
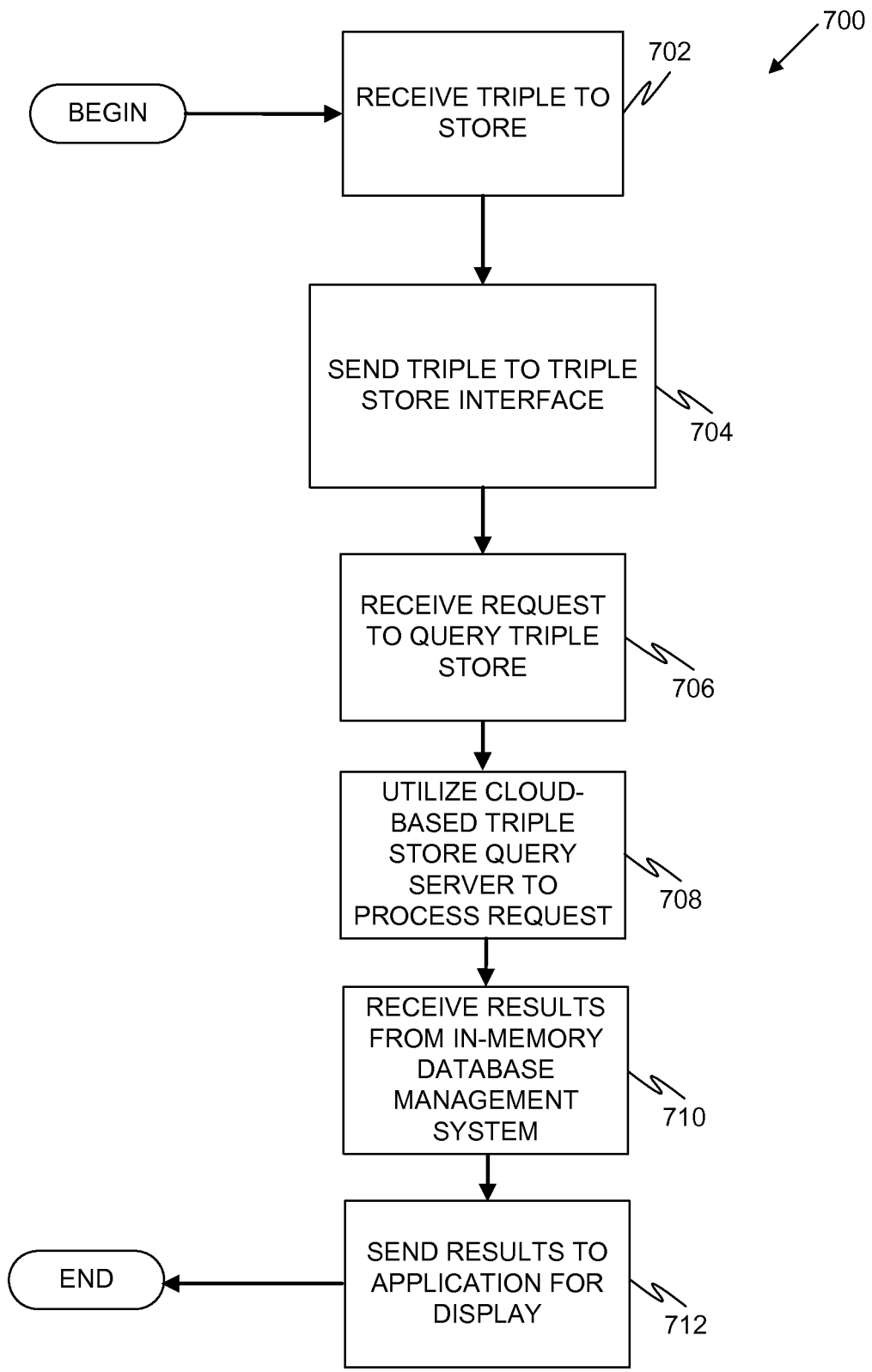
FIG. 7 is a flow diagram illustrating a method, in accordance with another example embodiment.

FIG. 7 is a flow diagram illustrating a method 700, in accordance with another example embodiment. At operation 702, a triple to store in a triple store is received from a first application. The triple defines data having a subject, predicate, and object. At operation 704, the triple is sent to a triple store interface configured to store the triple in an in-memory database management system. At operation 706, a request is received from a second application to query the triple store. At operation 708, a cloud-based triple store query server is utilized to process the request and generate an in-memory database management system query to the in-memory database management system. At operation 710, results of the in-memory database management system query are received from the in-memory database management system. At operation 712, the result is sent to the second application for display to a user.

Example Mobile Device

Figure 8:
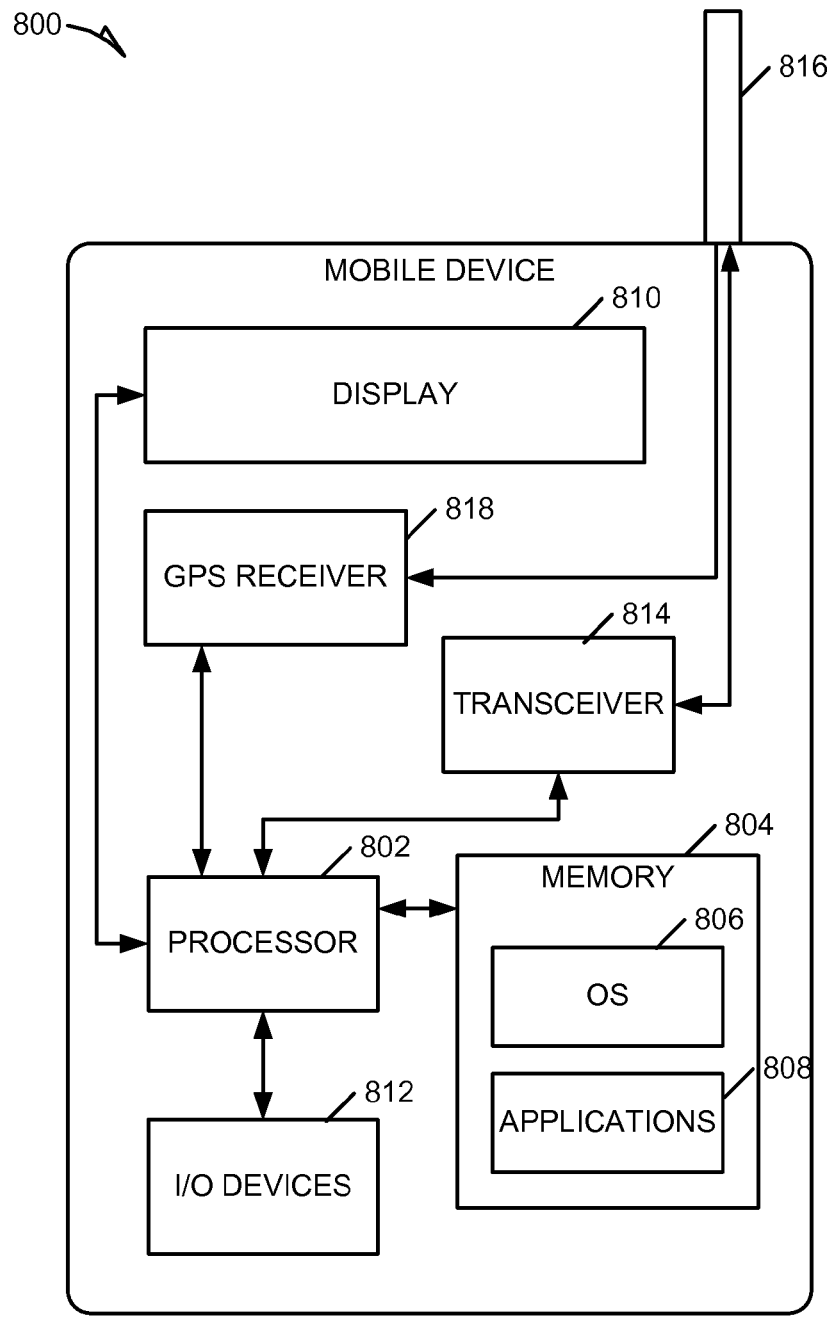
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 can be adapted to store an operating system (OS) 806, as well as application programs 808. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 802 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 802 or other programmable processor 802) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 802 configured using software, the general-purpose processor 802 can be configured as different hardware-implemented modules at different times. Software can accordingly configure a processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 802 that are temporarily configured (e.g., by software) or permanently configured to perform the relevant operations. Whether temporarily or permanently configured, such processors 802 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 802 or processor-implemented modules. The performance of certain of the operations can be distributed among the one or more processors 802, not only residing within a single machine, but deployed across a number of machines. In some example embodiments, the processor 802 or processors 802 can be located in a single location (e.g., within a home environment, an office environment or a server farm), while in other embodiments the processors 802 can be distributed across a number of locations.

The one or more processors 802 can also operate to support performance of the relevant operations in a "cloud computing" environment or as a "software as a service" (SaaS). For example, at least some of the operations can be performed by a group of computers (as examples of machines including processors 802), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a stand alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 802 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 802), or in a combination of permanently and temporarily configured hardware can be a design choice. Below are set out hardware (e.g., machine) and software architectures that can be deployed, in various example embodiments.

Example Machine Architecture and Machine-Readable Medium

Figure 9:
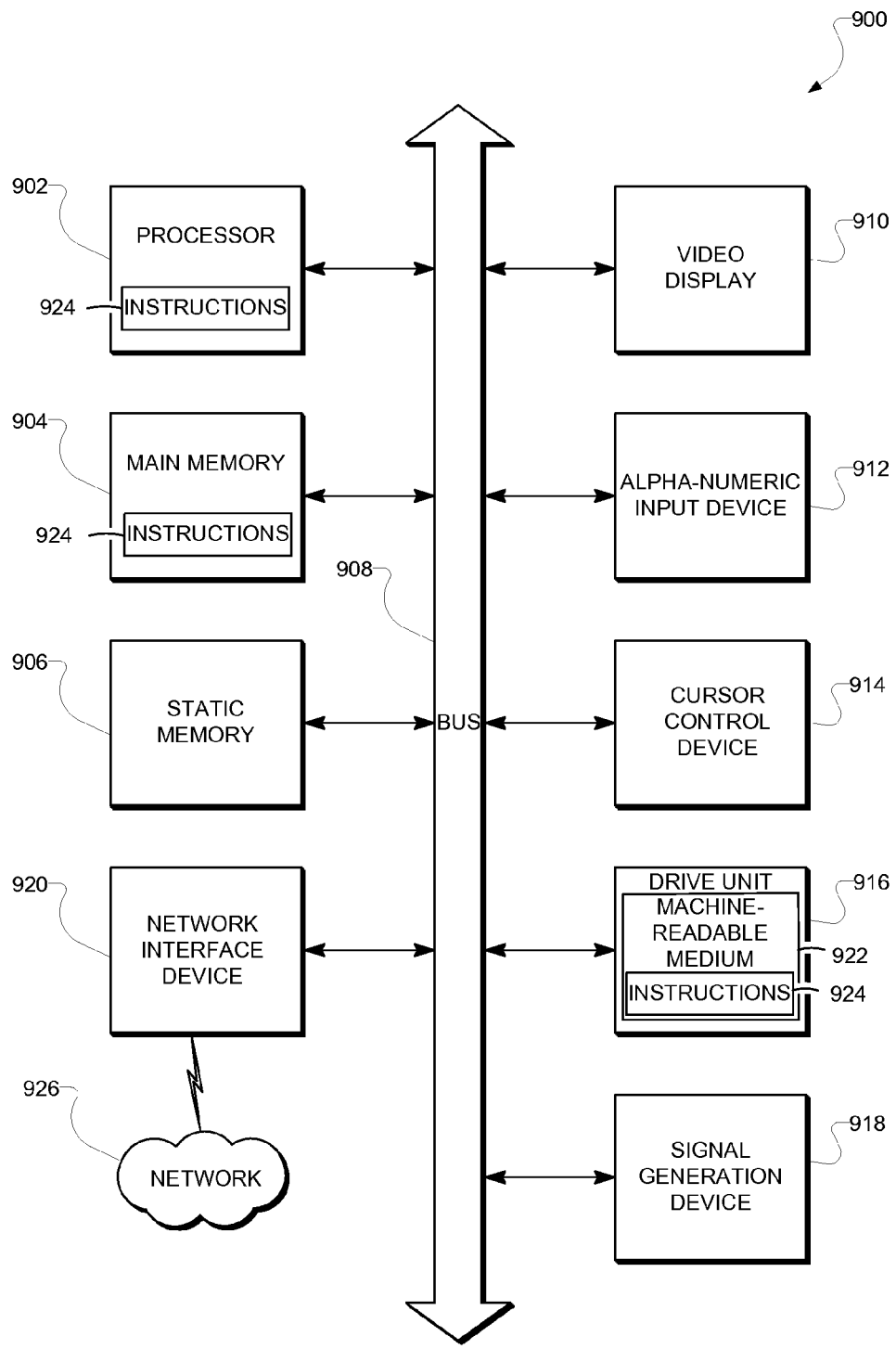
FIG. 9 is a block diagram of machine in the example form of a computer system within which instructions, for causing the machine to perform any one or more of the methodologies discussed herein, can be executed.

FIG. 9 is a block diagram of machine in the example form of a computer system 900 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a CPU, a graphics processing unit (GPU), or both), a main memory 904 and a static memory 906, which communicate with each other via a bus 908. The computer system 900 can further include a video display 910 (e.g., a liquid crystal display (LCD) or a cathode ray tube (CRT)). The computer system 900 also includes an alphanumeric input device 912 (e.g., a keyboard or a touch-sensitive display screen), a cursor control device 914 (e.g., a mouse), a drive unit 916, a signal generation device 918 (e.g., a speaker), and a network interface device 920.

Machine-Readable Medium

The drive unit 916 includes a machine-readable medium 922 on which is stored one or more sets of instructions (e.g., software) 924 embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions 924 for execution by the machine and that cause the machine to perform any one or more of the methodologies of the present disclosure or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can further be transmitted or received over a communications network 926 using a transmission medium. The instructions 924 can be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 924 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving, from a first application, a triple to store in a triple store, the triple defining data having a subject, predicate, and object;
receiving, from the first application, user, password, and connection parameters for access to the triple;
storing the user, password, and connection parameters as metadata in a cloud registry dynamically managed by a cloud environment;
generating a configuration file containing a pointer to a registry entry in the cloud registry in which the user, password, and connection parameters are stored;
sending the triple and the configuration file to a triple store interface configured to persist the triple in a triple store located in an in-memory database management system, the in-memory database management system comprising an in-memory database where data is persisted;
receiving a request from a second application to query the triple store;
utilizing a cloud-based triple store query server to process the request and generate an in- memory database management system query that includes authentication credentials to the triple store located in the in-memory database management system, the triple store configured to verify the authentication credentials by directly retrieving the metadata from the cloud registry using the pointer;

receiving results of the in-memory database management system query from the in-memory database management system; and sending the result to the second application for display to a user.

2. The method of claim 1, wherein the in-memory database management system is a relational database management system and the sending of the triple to the triple store interface is performed using a relational database language.

3. The method of claim 1, wherein the results are displayed to the user in the form of a graphical ontology.

4. The method of claim 3, further comprising:
receiving edits to the graphical ontology from the second application, the edits being input from the user via a graphical interface wherein the user graphically edits the graphical ontology.

5. The method of claim 1, wherein the triple store comprises a configuration file that has been modified to establish a connection to obtain metadata from a cloud registry.

6. The method of claim 1, wherein the triple store is configured in a way to avoid library conflicts by providing a split package.

7. The method of claim 1, further comprising:
receiving management requests from a management console, the management console designed to control the triple store, the in-memory database management system, and the cloud-based triple store query server.

8. A system comprising:
one or more processors;
a cloud registry configured to store user, password, and connection parameters as metadata, the cloud registry dynamically managed by a cloud environment;
an in-memory database management system persisting a triple store, the triple store containing a plurality of triples, each triple defining data having a subject, predicate, and object, the in-memory database management system comprising an in-memory database where data is persisted;
a triple store interface executable by the one or more processors and coupled to the in-memory database management system, the triple store interface configured to store the triples in the triple store of the in-memory database management system via commands from a first application;
a cloud-based triple store query server coupled to the triple store interface and configured to process a request from a second application to query one or more of the plurality of triples in the triple store of the in-memory database management system via commands from the second application, the query including authentication credentials, receive results of the query, and send the results to the second application for display to a user; and
the triple store configured receive a configuration file containing a pointer and to verify the authentication credentials by directly retrieving the metadata from the cloud registry using the pointer.

9. The system of claim 8, wherein the first application and the second application are the same application.

10. The system of claim 8, further comprising a management console configured to control the triple store, the in-memory database management system, and the cloud-based triple store query server.

11. The system of claim 8, wherein the second application is a graphical ontology editor and the cloud-based triple store query server is further configured to process edit commands from the graphical ontology editor and edit one or more of the plurality of triples in the triple store accordingly.

12. The system of claim 8, wherein the triple store comprises a configuration file that has been modified to establish a connection to obtain metadata from a cloud registry.

13. The system of claim 8, wherein each triple describes World Wide Web (WWW) information in a well-defined format as part of a semantic web.

14. A non-transitory machine-readable storage medium comprising instructions, which when implemented by one or more machines, cause the one or more machines to perform operations comprising:
receiving, from a first application, a triple to store in a triple store, the triple defining data having a subject, predicate, and object;
receiving, from the first application, user, password, and connection parameters for access to the triple;
storing the user, password, and connection parameters as metadata in a cloud registry dynamically managed by a cloud environment;
generating a configuration file containing a pointer to a registry entry in the cloud registry in which the user, password, and connection parameters are stored;
sending the triple and the configuration file to a triple store interface configured to persist the triple in a triple store located in an in-memory database management system, the in-memory database management system comprising an in-memory database where data is persisted;
receiving a request from a second application to query the triple store;
utilizing a cloud-based triple store query server to process the request and generate an in-memory database management system query that includes authentication credentials to the triple store located in the in-memory database management system, the triple store configured to verify the authentication credentials by directly retrieving the metadata from the cloud registry using the pointer;
receiving results of the in-memory database management system query from the in-memory database management system; and
sending the result to the second application for display to a user.

15. The non-transitory machine-readable storage medium of claim 14, wherein the triple describes World Wide Web (WWW) information in a well-defined format as part of a semantic web.

16. The non-transitory machine-readable storage medium of claim 14, wherein the results are displayed to the user in the form of a graphical ontology.

17. The non-transitory machine-readable storage medium of claim 15, wherein the operations further comprise:
receiving edits to the graphical ontology from the second application, the edits being input from the user via a graphical interface wherein the user graphically edits the graphical ontology.

18. The non-transitory machine-readable storage medium of claim 14, wherein the triple store comprises a configuration file that has been modified to establish a connection to obtain metadata from a cloud registry.

19. The non-transitory machine-readable storage medium of claim 14, wherein the triple store is configured in a way to avoid library conflicts by providing a split package.

20. The non-transitory machine-readable storage medium of claim 14, wherein the operations further comprise:

receiving management requests from a management console, the management console designed to control the triple store, the in-memory database management system, and the cloud-based triple store query server.

* * * * *